March 5, 1968  L. S. ANTLES ET AL  3,371,360

BEEHIVE EXIT DEVICE

Filed March 4, 1966

INVENTORS.
LUCILLE S. ANTLES
WALLACE EUGENE PARSONS
BY Fred C. Matheny
ATTORNEY.

United States Patent Office 3,371,360
Patented Mar. 5, 1968

3,371,360
BEEHIVE EXIT DEVICE
Lucille S. Antles, P.O. Box 1243, Wenatchee, Wash.
98801, and Wallace Eugene Parsons, Wenatchee,
Wash.; said Parsons assignor to said Antles
Filed Mar. 4, 1966, Ser. No. 531,993
3 Claims. (Cl. 6—4)

Our invention relates to a beehive exit device of the type used as an insert in connection with a beehive to promote the pollination of plant blossoms by honey bees and our invention is an improvement on the device disclosed in Patent No. 2,485,879, issued Oct. 25, 1949, to James E. Harwood.

Objects of our invention are to improve the construction of beehive exit devices of this type in such a manner as to make them easier to supply with live pollen and more efficient and economical in their use of such pollen.

Live pollen used for artificial pollination is composed of fine pollen grains which are light in weight and are usually mixed with other finely divided light weight material. Because of its light and fluffy nature it is somewhat difficult to handle and is easily blown away if exposed to much wind. Gathering this pollen and processing it and preserving its viability requires much time and labor and this makes the cost of the live pollen high enough so that it is very desirable to conserve it and avoid pollen losses and make it possible for the user to derive maximum benefit from the pollen used. Our invention makes it easier to supply this live pollen to a beehive exit device of the type described and facilitates a more even distribution of the pollen in a pollen chamber provided within the device and through which bees leaving the hive by way of the exit device must pass. Distributing the pollen evenly in the pollen chamber lessens the possibility of bees passing through or across this chamber without picking up enough pollen to adequately fertilize the blossoms they visit.

In beehive exit devices of the type herein disclosed it has been found to be desirable to provide a narrow, upwardly inclined exitway for the bees. This passageway is formed between an exit floor over which the bees crawl and a cover or ceiling member parallel with and spaced from this exit floor. Both the floor and the ceiling member are inclined upwardly from the horizontal at a fairly steep angle. A pollen chamber is disposed at the foot of this exit passageway and it is common practice to supply pollen to this pollen chamber by pouring it down through the narrow exit passageway and over the exit floor into the pollen chamber. During normal bee activity it is customary to supply from one to two level teaspoons of pollen to the pollen chamber each hour. This pollen is ordinarily supplied while the bees are active and are using the exit passageway of the device. It is difficult to pour this pollen down through the steeply inclined exit passageway and distribute it evenly from end to end of the device on the pollen chamber floor. This is particularly true when many of the bees are coming out of the exit passageway. Uneven distribution of the pollen in the pollen chamber can reduce the efficiency of the device by leaving areas where there is little or no pollen for bees to pick up as they move across said chamber.

An object of our invention is to provide a beehive exit device of this type having an exit floor formed in part of a ramp which can quickly and easily be lowered from a steeply inclined normal position into a more nearly horizontal loading position, or can even be entirely removed from the exit device, to provide enough clearance space between the ramp and the exit passageway ceiling so the pollen can be evenly spread over the floor of the pollen chamber by pouring it directly into said chamber or by depositing it evenly on the ramp and then allowing it to slide down, in an evenly distributed layer, into the pollen chamber as the ramp is moved back up to its normal position.

Other objects of our invention will be apparent from the following description and accompanying drawings.

In the drawings FIGURE 1 is a perspective view showing a fragment of a beehive with our beehive exit device applied thereto, part of the cover of the exit device being broken away.

Like reference numerals refer to like parts throughout the several views.

Figure 1:
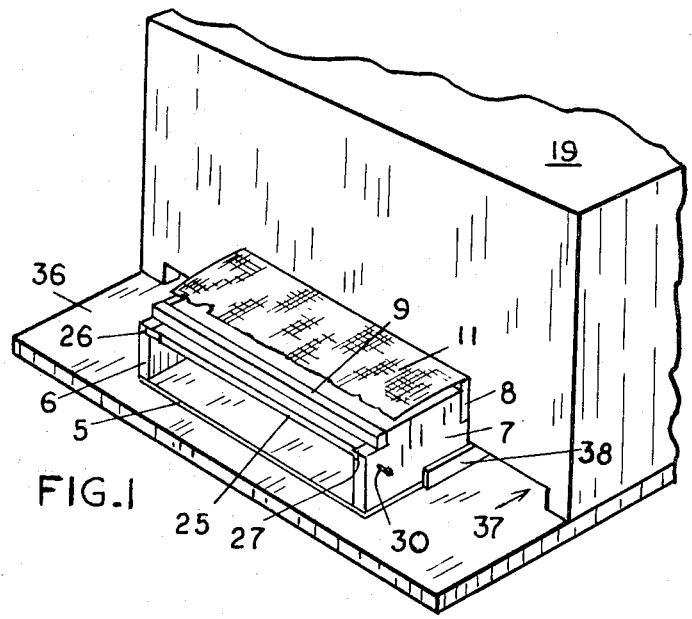

The frame portion of our exit device comprises a bottom 5, two end walls 6 and 7, a rear wall 8 and a front cross bar 9. The rear wall 8 is of less width than the end walls 6 and 7 to leave a fairly wide space 10 between the lower edge of said rear wall 8 and the plane of the bottom wall 5. A cover member 11 of light conductive material, such as waterproof screen cloth, is secured to the top edge of the rear wall 8 and rests on and extends beyond the cross bar 9 and has enough slope so that any water incident on it will discharge over its front edge.

Figure 2:
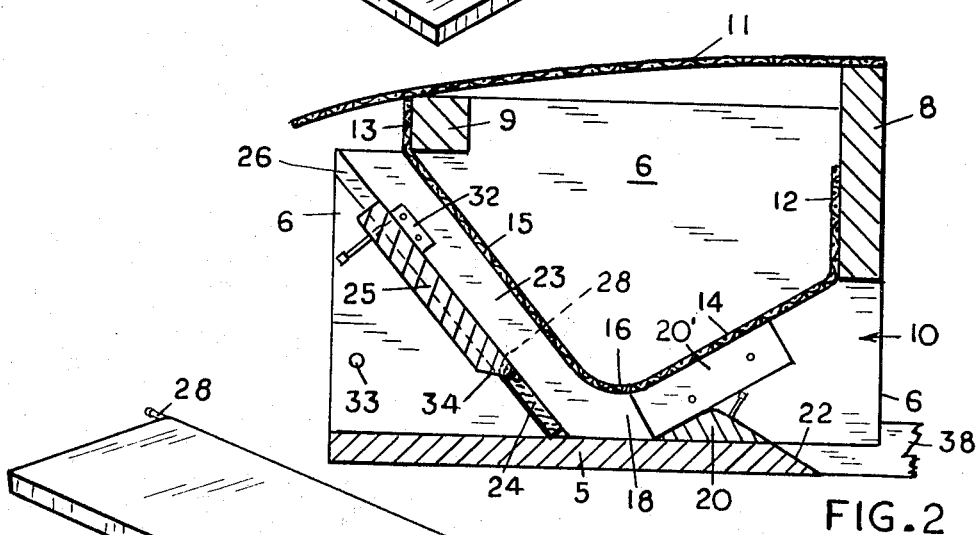
FIG. 2 is a view in cross section, on a larger scale than FIG. 1, taken substantially on broken line 2—2 of FIG. 1.
Figure 3:
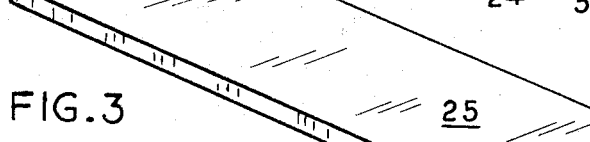
FIG. 3 is a detached perspective view of a bee exit ramp.

A trough-shaped guard or ceiling member, also preferably of waterproof screen cloth, is provided within the exit device. This ceiling member comprises two edge portions 12 and 13 which are secured respectively to the rear wall 8 and cross bar 9, two flat portions 14 and 15 extending convergently downward from the edge portions 12 and 13 and a rounded vertex portion 16 connecting the flat portions 14 and 15. The ceiling formed by parts 12 to 16 inclusive extends continuously from one end to the other of the exit device. The space below the vertex portion 16 serves as a pollen chamber 18 across which bees must pass in leaving a beehive by way of the exit device. An adjustable and removable clean-out strip 20 of triangular cross section is provided on the bottom member 5 between the pollen chamber and the beehive 19. A stop 20', one of which is shown in FIG. 2, is provided on each end wall 6 and 7 to correctly position the clean-out strip 20. The edge 22 of the floor member 5 adjacent the clean-out strip 20 is beveled to correspond with the bevel of strip 20. The beveling makes it easier for the bees to crawl over these parts.

Figure 4:
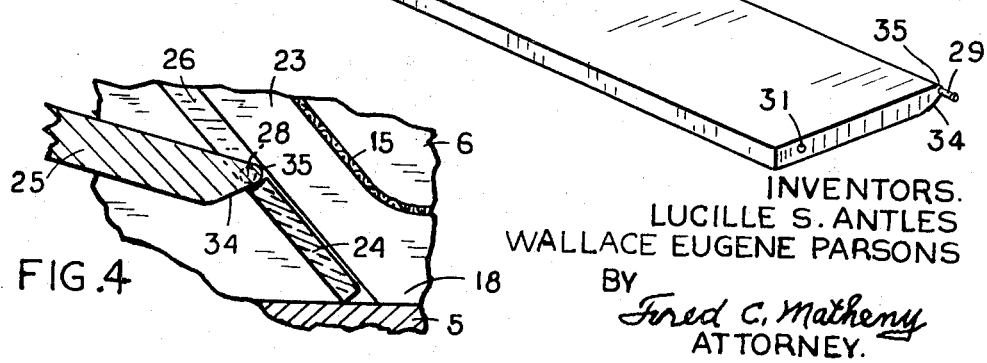
FIG. 4 is a fragmentary sectional view, on an enlarged scale, showing the ramp in a lowered position.

A narrow inclined bee exit passageway 23 extends upwardly and outwardly from the pollen chamber 18. The ceiling or upper wall of the passageway 23 is formed by ceiling wall 15 and a bee exit floor of said passageway 23 is formed by a lower narrow transparent strip 24, preferably of glass, and an upper swingingly mounted bee exit ramp 25, which may be wood. The two ends of the glass strip 24 are supported in opposed inclined grooves 26 and 27 in the two end members 6 and 7. The thickness of the ramp 25 is greater than the width of the grooves 26 and 27 and said ramp has two outwardly protruding end pins 28 and 29 which are positioned close to its lowermost edge and fit slidably and rotatively within the grooves 26 and 27 and cooperate in supporting the ramp 25 for swinging movement between a normal raised position in which it is shown in FIG. 2 and a lowered loading or servicing position in which it is shown in FIG. 4. When in its raised position the ramp 25 is supported by at least one pull-out pin 30 which extends slidably through an end wall 7 of the exit device and is slidably received within a suitable hole 31 in the end of the ramp 25. A stop member 32 limits upward movement of the ramp 25 and helps align the hole 31 with the pin 30 when the ramp 25 is in raised position. At least one other stop member 33 can be provided to limit downward swinging movement of the ramp 25.

Preferably the lower edge of the ramp 25 is beveled, as indicated by 34 and the uppermost corner 35 thereof rounded so that when it rests against the upper edge of the light conductive strip 24 the ramp can be swingingly moved between its uppermost and lowermost positions without opening up a crack through which pollen can escape if the pollen is allowed to slide downwardly over the ramp in loading it into the chamber 18. If desired the ramp 25 can easily be entirely removed from the exit device but lowering it into a position as shown in FIG. 4 usually provides easy enough access for loading purposes.

When it is in use this beehive exit device rests on an alighting platform 36 of the beehive 19 with its rear wall 8 against the front wall of the beehive and the opening 20 positioned in registration with the usual bee inlet and exit opening 37 at the front of the hive. Two bars 38 are secured to the end walls 6 and 7 and extend through opening 37 and cooperate in securing the exit device to the hive 19. The beehive exit devices now in common use have an upwardly inclined bee exit passageway similar to passageway 23, it being desirable to make this passageway narrow. This makes it difficult to introduce pollen through this exit passageway and distribute it evenly on the floor of the pollen chamber. The ramp 25 of our invention can be quickly and easily lowered into the position shown in FIG. 4 so as to leave a fairly large and unobstructed access opening through which pollen can be evenly spread directly in the pollen chamber 18 or can be evenly spread on the ramp 25 and transferred in fairly evenly distributed relation to the pollen chamber 18 by raising the ramp to its normal operative position.

The foregoing description and accompanying drawings clearly disclosed a preferred embodiment of our invention but it will be understood that changes may be made within the scope of the following claims.

We claim:

1. A beehive exit device for use in improving pollination of plant blossoms comprising a bottom, end walls, a rear wall and a front cross bar defining an exit enclosure, said rear wall being of less width than the end walls to provide an opening adpated to register with the bee inlet and outlet opening of a beehive, a longitudinally extending pollen chamber on the bottom of said exit enclosure, a narrow inclined bee exit passageway extending upwardly and outwardly from said pollen chamber, said passageway being formed by a pair of spaced apart parallel upwardly inclined walls extending from said pollen chamber, the lowermost wall of said passageway forming a bee exit floor, a portion of said bee exit floor adjacent the pollen chamber being a narrow strip of light conductive material, the remaining portion of said bee exit floor forming a pivotally supported ramp means, the axis of which is adjacent and parallel to the upper edge of said light conductive strip, stop means on at least one of said end walls to limit the upward movement of said ramp and readily releasable means adapted to support said ramp in substantially the same plane as the light conductive strip whereby said ramp can be lowered into a position which affords ready access to the pollen chamber for the introduction of pollen therein.

2. The apparatus as claimed in claim 1 in which the readily releasable ramp supporting means is a pin slidably supported in an end wall of the exit device and movable into and out of engagement with receiving means in said ramp to support the outer end portion of the ramp in a raised position when the pin is engaged therewith.

3. The apparatus as claimed in claim 1 in which two opposed inclined grooves are provided in opposed sides of the respective end walls of the exit device, and in which said ramp has two aligned pins protruding from its respective ends near its lowermost edge, said pins serving as the pivotal support for said ramp and being rotatively and longitudinally movable in said grooves and the lowermost edge of said ramp normally resting on the uppermost edge of said light conductive strip.

References Cited

UNITED STATES PATENTS

| | | | |
|---|---|---|---|
| 1,455,459 | 5/1923 | Troilo | 6—5 |
| 2,140,964 | 12/1938 | Meyer | 6—4 |
| 2,485,879 | 10/1949 | Harwood | 6—4 |
| 3,069,702 | 12/1962 | Reed | 6—4 |
| 3,200,419 | 8/1965 | Root | 6—4 |

LUCIE H. LAUDENSLAGER, *Primary Examiner.*